United States Patent [19]

Miyahara

[11] Patent Number: 5,577,038
[45] Date of Patent: Nov. 19, 1996

[54] DIGITAL COMMUNICATION PATH NETWORK HAVING TIME DIVISION SWITCHES AND A CELL SWITCH

[75] Inventor: Keiichi Miyahara, Tokyo, Japan

[73] Assignee: NEC Corporation, Tokyo, Japan

[21] Appl. No.: 351,513

[22] Filed: Dec. 7, 1994

[30] Foreign Application Priority Data

Dec. 14, 1993 [JP] Japan ................................. 5-313364

[51] Int. Cl.⁶ ................................................. H04L 12/56
[52] U.S. Cl. ...................................... 370/60.1; 370/58.2
[58] Field of Search ........................ 370/60.1, 60, 94.1,
370/94.2, 110.1, 53, 54, 55, 56, 58.1, 58.2,
58.3, 59, 61, 62, 63, 64, 65.5, 66, 67, 68,
68.1, 77, 95.1, 95.2, 95.3, 99, 112, 109,
108; 340/825.02, 825.01, 825.03; 379/94,
95, 164, 165, 171, 172, 173; 348/6, 7, 8,
15, 16, 384; 375/240; 455/3.1, 3.2, 4.2

[56] References Cited

U.S. PATENT DOCUMENTS 5,394,397  2/1995  Yanagi et al. .......................... 370/60.1

FOREIGN PATENT DOCUMENTS 57-143967  9/1982  Japan .
60-140969  7/1985  Japan .

Primary Examiner—Douglas W. Olms
Assistant Examiner—Dang Ton
Attorney, Agent, or Firm—Sughrue, Mion, Zinn, Macpeak & Seas

[57] ABSTRACT

A digital communication path network includes a first time division switch for producing a first time division multiplexed transmission signal, a cell assembly section for generating a broadcasting cell address, and for forming a cell from the transmission signal and the broadcasting cell address, a cell switch for transferring the cell from the cell assembly means to a plurality of output ports in accordance with the broadcasting cell address, a plurality of cell disassembly units respectively connected to the plurality of output ports, each for disassembling the cell, a plurality of second time division switches respectively connected to the plurality of cell disassembly units, each for producing a second time division multiplexed transmission signal from the disassembled cell in response to a time slot control instruction and a control section for selectively issuing the time slot control instruction to each of the plurality of second time division switches based on a communication path connection information for each of the plurality of second time division switches.

12 Claims, 5 Drawing Sheets

DIGITAL COMMUNICATION PATH NETWORK HAVING TIME DIVISION SWITCHES AND A CELL SWITCH

BACKGROUND OF THE INVENTION

1. Field of the Invention

The present invention relates to a digital communication path network, and more particularly, to a digital communication path network having time division switches and a cell switch as a space division switch in which the 64-Kbps (bits/s) base service and the broadband switching service can be provided to perform a multiple connection of communication paths for broadcasting.

2. Description of the Related Art

A space division switch, comprised of a conventional digital communication path network of a digital switching system, performs a function that a time slot data multiplexed to 64 Kbits/s and having been inputted in a certain input highway is to be outputted into the same time slot location of a specified output highway. When a higher transmission speed more than 64 Kbits/s is required in the digital switching system, e.g., 64×n bits/s and H0/H1 service using the H channel, a plural number of time slots are used for switching such a high speed data.

A conventional digital communication path network including a space switch can also perform a multiple connection which outputs the same data having been inputted from a specified input port to a plural number of output ports. The Japanese Patent Laid-open No. 57-143967 or No. 60-140969 discloses this multiple connection technology of a digital communication path network. An example of the digital communication path network used in a conventional digital switching system is shown in FIG. 1. The digital switching system includes a main controller 200. In a case where an audio signal or data as user information from a telephone 201 is to be transmitted to a telephone 220, the telephone 201 generates communication path connection information which is supplied to the main controller 200 via a subscriber circuit 202 and the main controller 200 controls controllers 206a, 210a and 212a based on the communication path connection information. Also, the telephone 201 outputs the audio signal or data as the user information to a concentration switch 204 via the subscriber circuit 202. The concentration switch 204 selects the audio signal or data supplied from the telephone 201 as a transmission signal to output to a primary time division switch 206. The primary time division switch 206 performs time division multiplexing (TDM) for the transmission signal and a time slot switching under control of the controller 206a to produce a TDM signal and output it to a space division switch 210. The space division switch 210 outputs the TDM signal to a specified secondary time division switch 212 under control by the controller 210a. Under control by the controller 212a, the secondary time division switch 212 performs a time slot switching and supplies the TDM signal as the transmission signal to the telephone 220 via a concentration switch 216 and a subscriber circuit 218. The same matter is performed in a case of using time division switches 208 and 214, controllers 208a and 214a, a concentration switch 222, a subscriber circuit 224 and a telephone 226. In this manner, the user information from the telephone 201 can be transmitted to the telephone 220.

When a multiple connection of communication paths is required for broadcasting an audible signal and/or announcement messages to unspecified number of subscribers, such a signal resource is to be connected through the space division switch to the input port of all secondary time division switches by which the multiple connection is performed.

On the other hand, there is the demand for broadband switching service for higher speed transmission. In the broadband switching service, the cell base switching service is required as represented by an asynchronous transfer mode (ATM). Therefore, a cell switch network is necessary.

Therefore, a digital communication path network having time division switches and a cell switch as a space division switch should perform the complicated connection control for signal broadcasting in which a signal resource is to be connected to the input port of the cell switch and to be distributed to the secondary time division switches through the cell switch.

SUMMARY OF THE INVENTION

An object of the present invention is to provide a method of broadcasting user information in a digital communication system with a simple configuration.

Another object of the present invention is to provide a method of achieving the 64-Kbit base service and broadband switching service in a digital communication system including time division switches and a cell switch.

Further another object of the present invention is to provide a digital communication system including time division switches and a cell switch in which user information can be broadcasted with a simple configuration.

Still another object of the present invention is to provide a digital communication system including time division switches and a cell switch in which broadband communication and audio signal communication can both be performed.

In order to achieve the present invention, a digital communication path network includes a first time division switch for producing a first time division multiplexed transmission signal, a cell assembly section for generating a broadcasting cell address, and for forming a cell from the transmission signal and the broadcasting cell address, a cell switch for transferring the cell from the cell assembly means to a plurality of output ports in accordance with the broadcasting cell address, a plurality of cell disassembly units respectively connected to the plurality of output ports, each for disassembling the cell, a plurality of second time division switches respectively connected to the plurality of cell disassembly units, each for producing a second time division multiplexed transmission signal from the disassembled cell in response to a time slot control instruction and a control section for selectively issuing the time slot control instruction to each of the plurality of second time division switches based on a communication path connection information for each of the plurality of second time division switches.

In order to achieve the present invention, a digital communication path network includes a first time division switch for performing a time division multiplexing for a transmission signal to produce a first time division multiplexing signal, a cell assembly section for generating a cell address in response to an address generation instruction, for forming a cell from the first time division multiplexing signal and the cell address, a control section for issuing the address generation instruction to the cell assembly section based on a communication path connection information for the transmission signal, a cell switch having a plurality of output ports, for transferring the cell from the cell assembly section to a specific one of the plurality of output ports in accordance with the cell address, a plurality of cell disassembly units respectively connected to the plurality of output ports, wherein a specific one of the plurality of cell disassembly units connected to the specific output port disassembling the cell, and a plurality of second time division switches respectively connected to the plurality of cell disassembly units, wherein a specific one of the plurality of second time division switches connected to the specific cell disassembly unit performs a time division multiplexing for the disassembled cell to produce a second time division multiplexing signal corresponding to the transmission signal.

DESCRIPTION OF THE PREFERRED EMBODIMENTS

The present invention will be described below in detail with reference to the accompanying drawings.

Figure 1:
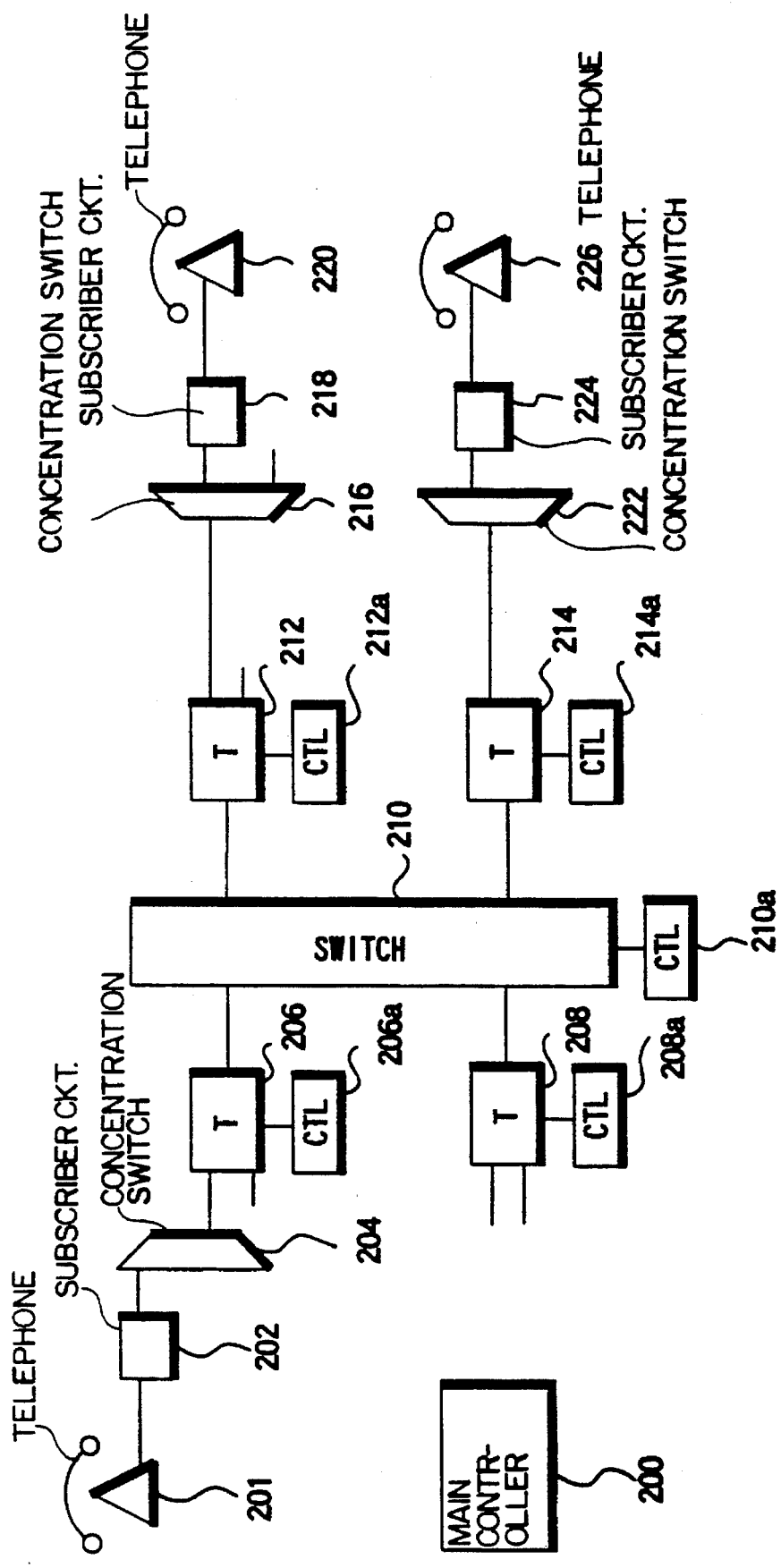
FIG. 1 is a block diagram showing a conventional digital communication system.
Figure 2:
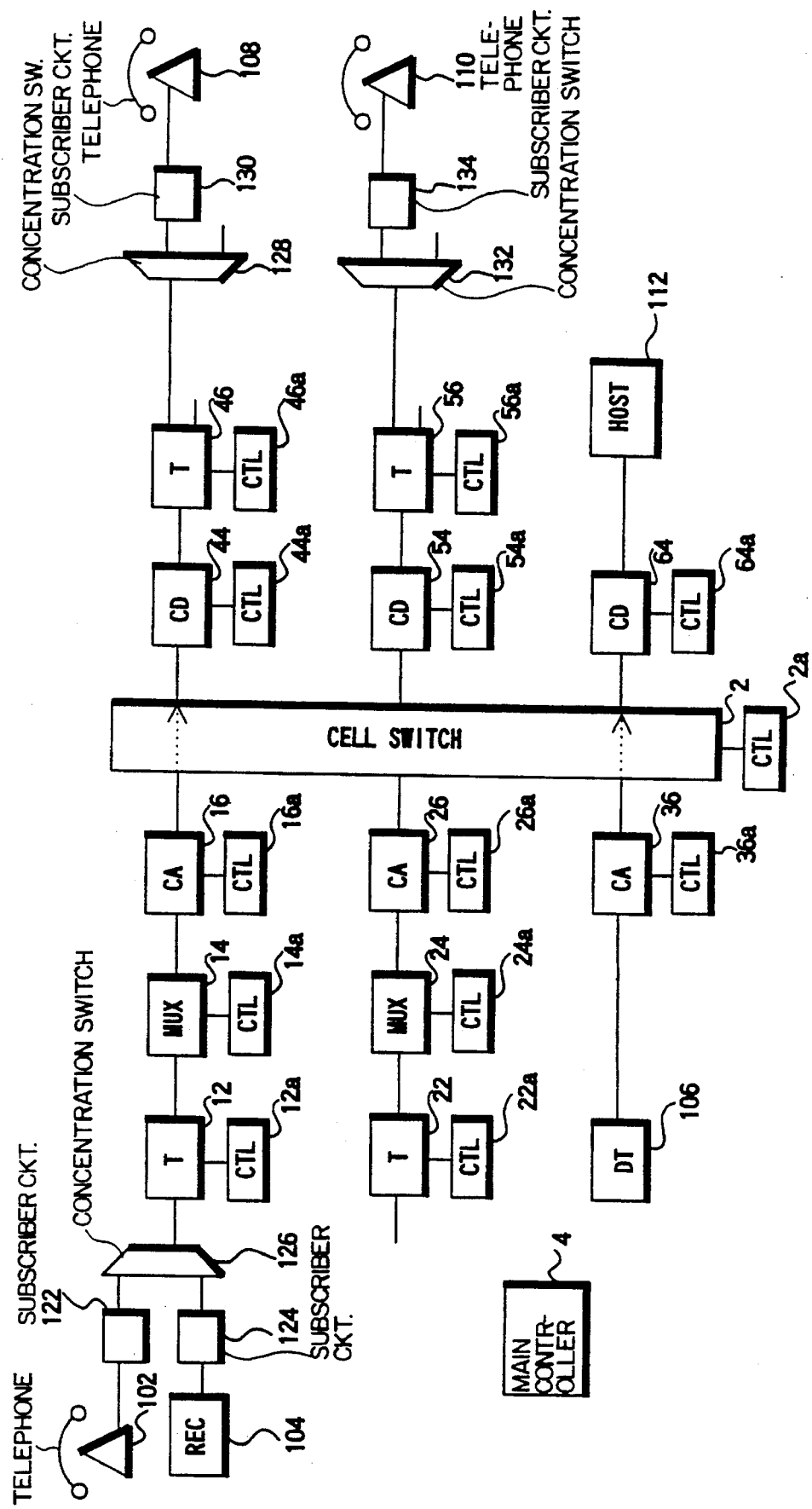
FIG. 2 is a block diagram showing a digital switching system having a digital communication path network according to an embodiment of the present invention.

FIG. 2 is a block diagram showing a digital switching system having a digital communication path network according to an embodiment of the present invention which can provide the 64-Kbit base service for an audio signal and the broadband switching service for a large amount of data. In the figure, with respect to a cell switch, the left side shows a primary side and a right side shows the secondary side.

The digital switching system includes a main controller 4. Where an audio signal from a telephone 102 is to be transmitted to a telephone 108, the telephone 102 first generates communication path connection information which is supplied to the main controller 4 via a subscriber circuit 122. The main controller 4 can control the whole system based on the communication path connection information. The telephone 102 also generates and outputs the audio signal as user information to a concentration switch 126 via the subscriber circuit 122. A tape recorder 104 reproduces an audio signal as user information and outputs to the concentration switch 126 via a subscriber circuit 124. The concentration switch 126 selects ones from among the audio signals from the telephone 102, the tape recorder 104 and the other equipments (not shown) under control of the main controller 4 and outputs them to a time division switch 12 as transmission signals. The audio signal from the telephone 102 is contained in the transmission signals. The time division switch 12 is controlled by a controller 12a which is controlled by the main controller 4 and receives the transmission signals to perform the time division multiplexing for the transmission signals under control of the controller 12a. That is, the time division switch 12 outputs each of the transmission signals on time slots determined by the controller 12a in accordance with an instruction from the main controller 4. This time division switching service is well known to a person skilled in the art. A time division switch 22 and a controller 22a have the same configuration as those of the switch 12 and controller 12a.

A multiplexer 14 receives time division multiplexed (TDM) signals from the time division switch 12 under control of a controller 14a, which is controlled by the main controller 4. The multiplexer 14 multiplexes the TDM signals for every time slot. When data for a predetermined amount, e.g., 48 bytes are stored, the multiplexer 14 outputs the stored data to a cell assembling unit 16. The cell assembling unit 16 is controlled by a controller 16a, which is controlled by the main controller 4. The controller 16a includes a translation table and refers to the translation table to retrieve a destination as a cell address in response to a cell address generation instruction issued from the main controller 4 based on the communication path connection information. The cell assembling unit 16 receives the cell address and generates a header including the cell address. The header has a predetermined data length, of e.g., 5-byte length. Also, the cell assembling unit 16 receives the data from the multiplexer 14 to add the header to it so that a cell is completed. The cell is outputted to a cell switch 2 as a space division switch. The multiplexer 14 and the cell assembling unit 16 constitutes a cell assembly means. A multiplexer 24, controller 24a, cell assembling unit 26 and controller 26a have the same configuration as those of the units 14, 14a 16, and 16a, respectively.

Figure 3:
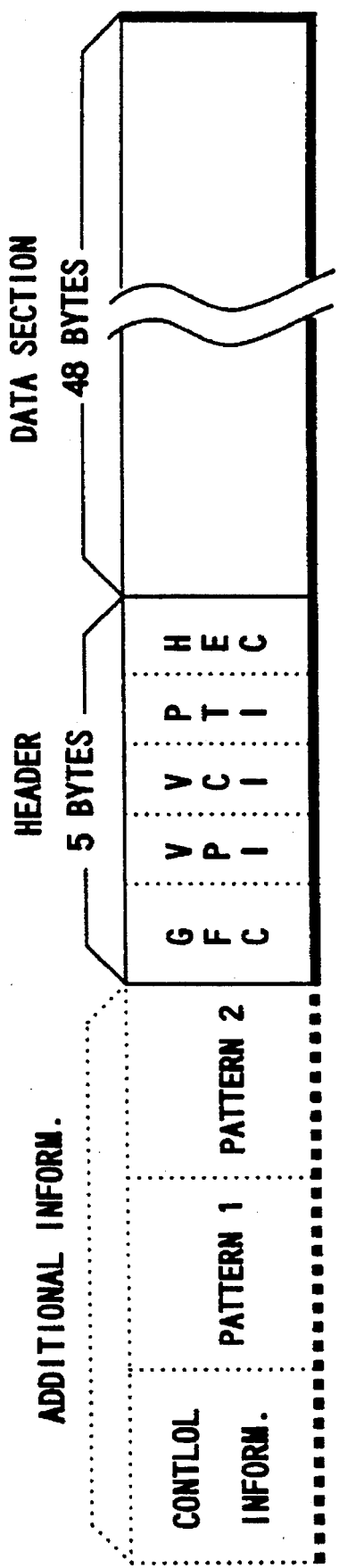
FIG. 3 is a diagram showing the format of a cell used in the embodiment.

The format of the cell formed at this time is shown in FIG. 3. This format is a standard format. The cell is formed of a data section of 48 bytes and a header section of 5 bytes. The header section includes a General flow control (GFC) field, a virtual path identifier (VPI) field, a virtual line control identifier (VCI) field, a cell type identifier (PTI) field, and a header error detection control (HEI) field. The data section is transferred from the multiplexer 14 to the cell assembling unit 16. The cell address generated by the cell assembling unit 16 is set in the VPI and VCI fields in the header section. The header section is combined with the data section to complete a cell.

The cell switch 2 has a plurality of input ports and a plurality of output ports and is controlled by a controller 2a which is controlled by the main controller 4. The controller 2a checks the cell address to control the cell switch 2 such that the cell is transferred to a specific one of the plurality of output ports designated by the cell address. In this case, the cell is transferred to the output port to which a cell disassembly unit 44 is connected. The cell disassembly unit 44 is controlled by a controller 44a which is controlled by the main controller 4. The cell disassembly unit 44 disassembles the cell into the transmission signal of 64-Kbit base and outputs a time division switch 46. The time division switch 46 is controlled by a controller 46a which is controlled by the main controller 4. The time division switch 46 performs time division multiplexing for the transmission signal of the 64-Kbit base from the cell disassembly unit 44 to carry the audio transmission signal as the user information using predetermined time slots to a concentration switch 128. A cell disassembly unit 54, controller 54a, time division switch 56 and controller 56a have the same configuration as those of the units 44, 44a, 46 and 46a, respectively.

The concentration switch 128 supplies the carried user information to the telephone 108 via a subscriber circuit 130. In this manner, the speech signal from the telephone 102 can be transmitted to the telephone 108.

A data terminal 106 outputs a packet to a cell assembling unit 36 controlled by a controller which is controlled by the main controller 4. The cell assembling unit 36 generates a cell address and forms a cell from the packet and the cell address to supply the cell switch 2. The cell switch 2 transfer the cell to a cell disassembly unit 64 as in the cell from the cell assembling unit 16. The cell disassembly unit 64 is controlled by a controller 64a which is controlled by the main controller 4. The cell disassembly unit 64 recovers the packet from one or more cells and supplies the packet to a host 112. In this manner, a large amount of data can be transmitted using the broadband switching service.

According to the above embodiment, both the audio signal switching service and the broadband switching service can be achieved in the digital communication path network having a cell switch as a space division switch.

Next, the second embodiment of the present invention will be described below with reference to FIG. 4. In the above embodiment, the audio signal from the telephone 102 or the tape recorder 104 is individually transmitted to the telephone 108. When an audio signal is to be broadcasted to all the terminals, e.g., the telephones 108 and 110, the main controller 4 needs to control the controllers 14a and 16a on the primary side, the controllers 44a, 46a, 54a and 56a on the secondary side, and the controller 2a. Therefore, the control is complicated. In this embodiment, however, the control is simplified. It should be noted that the same components as in FIG. 2 are assigned with the same reference numerals.

Figure 4:
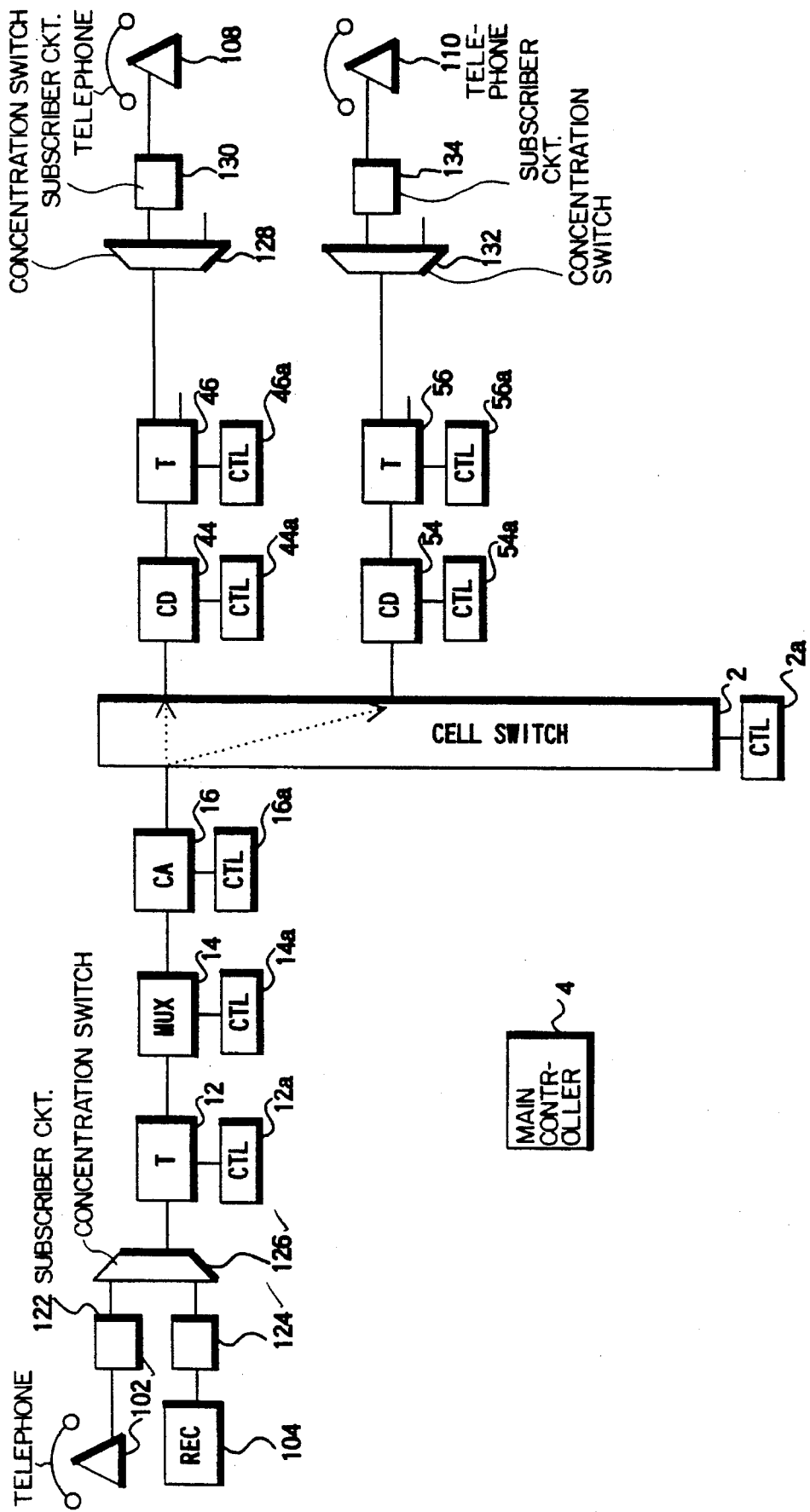
FIG. 4 is a block diagram showing a digital communication path network according to another embodiment of the present invention.

In FIG. 4, the audio signal from, for example, the tape recorder 104 is assigned to a predetermined time slot and supplied to the multiplexer 14. The multiplexer 14 receives the audio signal from the time slots and multiplexes it in a predetermined manner. When the data section of a cell is formed, the multiplexer 14 outputs it to the cell assembling unit 16. The controller 16a generates a cell address for broadcasting. The cell assembling unit 16 receives the cell address for broadcasting from the controller 16a and forms a header by filling the VPI and VCI fields with the cell address for broadcasting. Then the cell assembling unit 16 completes a cell from the header and the data section to output to the cell switch 2. The cell switch 2 transfers the cell to the cell disassembly units 44 and 54 under control of the controller 44a and 54a. The cell disassembly units 44 and 54 disassembles the cell into time division multiplexing (TDM) signals, respectively. The time division switches 46 and 56 are controlled by the main controller 4 via the controllers 46a and 56a and receive the TDM signals to transfer to the telephones 108 and 110. In this manner, in the embodiment, the main controller 4 needs not to always control the controllers 12a, 14a and 16a. The main controller 4 only needs to control the controllers 46a and 56a for broadcasting the audio signal to the telephones 108 and 110. As described above, in the embodiment, the control for broadcasting is simplified.

Figure 5:
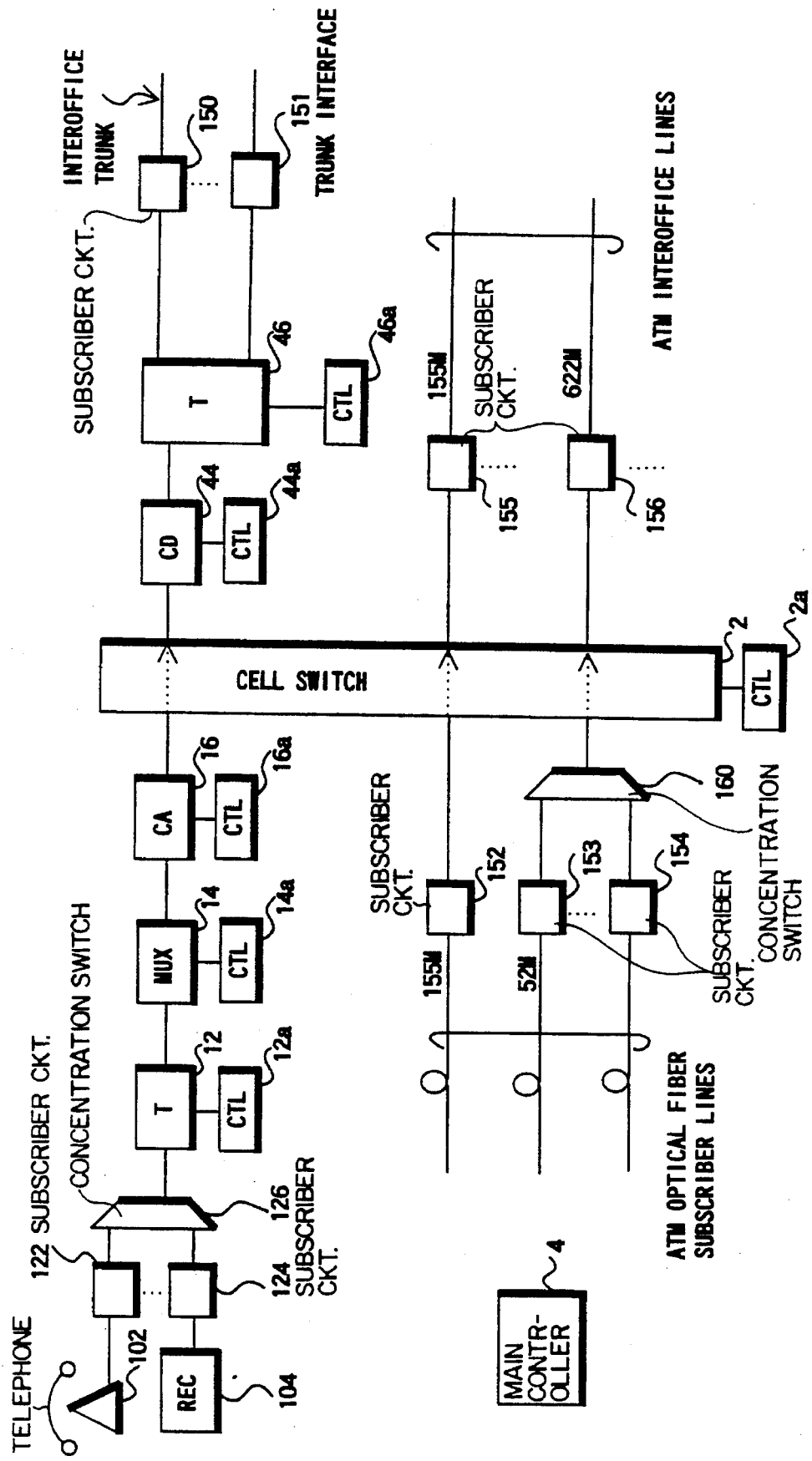
FIG. 5 is a block diagram showing a digital communication path network according to still another embodiment of the present invention.

In a case where this digital communication path network of the present invention is connected to an interoffice trunk 150 or 151 as shown in FIG. 5, the cell has the format as described above, i.e., the format of the header of 5 bytes and the data section of 48 bytes. However, in a case where the system is not connected to the interoffice trunk, a different format may be used. In this case, as shown in FIG. 3, additional information may be added to the cell. The additional information includes control information indicative of whether the cell is for broadcasting, for limited broadcasting, or for single path transmission, and one or more patterns. When the audio signal is to be broadcasted, the header is formed by the cell assembling unit 16 to have the control information for broadcasting as described above.

When the audio signal is to be limitedly broadcasted, the controller 16a refers to the translation table in response to the address generation instruction issued from the main controller 4 based on the communication path connection information, and retrieves one or more patterns for destinations of the audio signal. The cell assembling unit 16 generates a header and combines the header with the data section from the multiplexer 14 to complete a cell. Further, the cell assembling unit 16 adds the control information and one or more patterns to the cell as the additional information to complete a final cell. The final cell is outputted to the cell switch 2. The controller 2a checks the control information and designates the output ports for the audio signal to be transferred based on the one or more patterns when it is determined based on the control information that the audio signal is to be limitedly broadcasted. The subsequent operation is the same as in the individual transmission. In this manner, when the communication path network switching system is not connected to any interoffice trunk, a unique format of a cell can be used.

What is claimed is:

1. A digital communication path network comprising:

a first time division switch for producing a first time division multiplexed transmission signal:

cell assembly means for generating a broadcasting cell address, and for forming a cell from said transmission signal and the broadcasting cell address;

a cell switch for transferring the cell from said cell assembly means to a plurality of output ports in accordance with the broadcasting cell address;

a plurality of cell disassembly units respectively connected to said plurality of output ports, each for disassembling the cell;

a plurality of second time division switches respectively connected to said plurality of cell disassembly units, each for producing a second time division multiplexed transmission signal from the disassembled cell in response to a time slot control instruction; and control means for selectively issuing the time slot control instruction to each of said plurality of second time division switches based on a communication path connection information for each of said plurality of second time division switches.

2. A method of broadcasting a user information in a digital communication path network including a first time division switch and a plurality of second time division switches and a cell switch interposed between the first time division switch and the plurality of second time division switches, comprising the steps of:

producing a first time division multiplexed signal for the user information by the first time division switch;

forming a cell from the first time division multiplexed signal and a broadcasting cell address;

transferring the cell to a plurality of output ports of the cell switch in accordance with the broadcasting cell address;

disassembling the cell supplied from each of the plurality of output ports;

controlling each of the plurality of second time division switches to produce a second time division multiplexed signal for the user information from the disassembled cell based on a communication path connection information for each of the plurality of second time division switches.

3. A digital communication path network comprising:

a first time division switch for performing a time division multiplexing for a transmission signal to produce a first time division multiplexing signal;

a cell assembly means comprising a plurality of cell assembly units, a specific cell assembly unit is connected to said first time division switch, for generating a cell address in response to an address generation instruction, for forming a cell from the first time division multiplexing signal and the cell address;

a control means for issuing the address generation instruction to said specific cell assembly unit based on a communication path connection information for the transmission signal;

a cell switch having a plurality of output ports, for transferring the cell from said cell assembly means to a specific one of said plurality of output ports in accordance with the cell address;

a plurality of cell disassembly units respectively connected to said plurality of output ports, wherein a specific cell disassembly unit of said plurality of cell disassembly units connected to said specific output port disassembles the cell; and a plurality of second time division switches respectively connected to some of said plurality of cell disassembly units, wherein a specific second time division switch connected to said specific cell disassembly unit performs a time division multiplexing for the disassembled cell to produce a second time division multiplexing signal corresponding to the transmission signal.

4. A digital communication path network according to claim 3, wherein said control means generates the address generation instruction for broadcasting based on the communication path connection information when the transmission signal is to be broadcasted, wherein said specific cell assembly unit generates the cell address for broadcasting, and wherein said cell switch transfers the cell to the output ports connected to plurality of cell disassembly units which are connected said second time division switches in accordance with the cell address.

5. A digital communication path network according to claim 3, wherein said specific cell assembly unit comprises:

a multiplexing unit for multiplexing the first time division multiplexing signal for every time slot to form a data portion of the cell; and a cell assembling unit for generating a header including the cell address in response to the address generation instruction, and for adding the header to the data portion to complete the cell.

6. A digital communication path network according to claim 5, wherein said control means generates the address generation instruction for limited broadcasting based on the communication path connection information when the transmission signal is to be transmitted to specific ones of said plurality of second time division switches, wherein said cell assembling unit further generates an additional address information indicative of said second specific time division switches in response to the address generation instruction and adds the additional address information to the cell.

7. A digital communication path network according to claim 6, wherein said control means includes a plurality of destination patterns, each being indicative of said second specific time division switches and selects one of the plurality of destination patterns based on the communication path connection information to issue the address generation instruction including the selected destination pattern.

8. A method of transmitting a user information in a digital communication path network comprising the steps of:

performing a time division multiplexing for the user information to produce a first time division multiplexing signal;

forming a cell including a cell address from the first time division multiplexing signal in accordance with a communication path connection information;

switching a communication path for the cell to a specific one of a plurality of output ports in accordance with the cell address;

controlling a plurality of cell disassembly units and a plurality of second time division switches such that a specific one of said plurality of cell disassembly units connected to said specific output port disassembles the cell and a specific one of said plurality of second time division switches connected to said specific cell disassembly unit performs a time division multiplexing for the disassembled cell to produce a second time division multiplexing signal corresponding to the user information.

9. A method according to claim 8, wherein said controlling step includes generating an address generation instruction for broadcasting based on the communication path connection information when the user information is to be broadcasted, wherein said forming step includes generating the cell address for broadcasting, and wherein said switching step includes transferring the cell to all the output ports in accordance with the cell address.

10. A method according to claim 8, wherein said controlling step includes generating an address generation instruction based on the communication path connection information, and wherein said forming step comprises the steps of:

multiplexing the first time division multiplexing signal for every time slot to form a data portion of the cell;

generating a header including the cell address in response to the address generation instruction; and adding the header to the data portion to complete the cell.

11. A method according to claim 10, wherein said controlling step includes generating the address generation instruction for limited broadcasting based on the communication path connection information when the user information is to be transmitted to specific ones of said plurality of second time division switches, wherein said forming step comprises the steps of:

generating an additional address information indicative of said second specific time division switches in response to the address generation instruction; and adding the additional address information to the cell.

12. A method according to claim 11, further comprising the step of providing a plurality of destination patterns, each being indicative of said second specific time division switches, and wherein said controlling step includes selecting one of the plurality of destination patterns based on the communication path connection information to issue the address generation instruction including the selected destination pattern.

* * * * *